Patented July 19, 1932

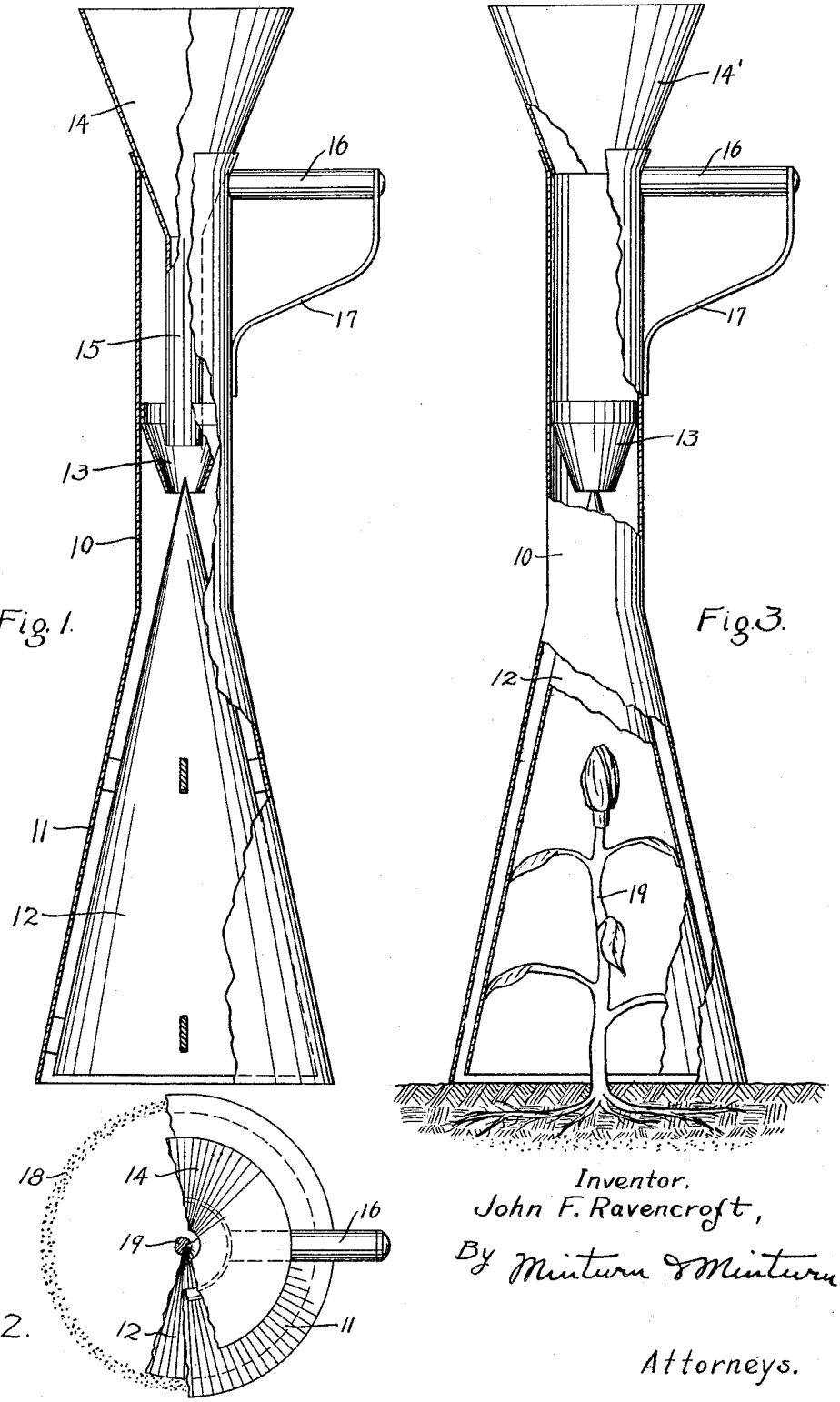

1,868,025

UNITED STATES PATENT OFFICE

JOHN F. RAVENCROFT, OF UNION MILLS, INDIANA

FERTILIZER DISTRIBUTOR

Application filed May 9, 1931. Serial No. 536,124.

This invention relates to the art of fertilizer distributors and particularly to means for distributing fertilizer at a uniform distance around growing plants.

A primary object of the invention is to provide means light in weight which may be carried by a man in going from plant to plant and which may be operated without requiring him to stoop over.

Another important object is to provide a distributor which will cause the fertilizer to be distributed in a uniform circle about a plant.

A further important object is to provide a distributor which will protect a plant and keep it from being sprinkled with fertilizer while the fertilizer is being distributed around its base.

These and other objects such as the low cost of production and ease of operation will become apparent in the following description of the invention as illustrated by the accompanying drawing, in which Fig. 1 is a fragmentary side elevation of a structure embodying my invention;

Fig. 2 a fragmentary top plan view of the structure; and

Fig. 3, a fragmentary elevation of a modified form.

Referring to the drawing, in which like characters of reference indicate like parts, I form a tubular body 10 to have a lower outer flaring base 11 entirely open at the bottom. Within this base 11, I position a hollow cone 12, the apex of which is within the body 10 and on the longitudinal center line thereof. The cone 12 is inserted within the base 11 to have a uniform space therearound between it and the inner side of the base.

Within the tubular body 10 I fix a cup 13 frustro-conical in shape with the bottom entirely open and receiving therethrough the apex of the cone 12. In the upper end of the tubular body 10, I fix a funnel member 14 from the lower end of which extends a tube 15 downwardly to within the cup 13.

A handle 16 is fixed to near the upper end of the body 10 to project laterally therefrom and a brace 17 extends from the outer end of the handle around and is secured to the body 10.

As shown in Fig. 3, a modified form of the structure as above described may be used under some conditions. In this modified form, the funnel member 14' has its lower side cut off substantially at the upper end of the tubular body 10 and does not project therewithin. The tube 15 is dispensed with but in other respects the structure is the same.

In operation, the operator carries a supply of fertilizer over a shoulder and walks along the row of plants grasping the distributor by its handle 16 by one hand. When he comes to a plant the distributor is placed thereover and brought down substantially to the ground and the desired amount of fertilizer is poured into the funnel 14 from which it drops down into the cup 13 and out onto the cone 12 where it slides downwardly therearound to be deposited on the ground in a uniform circle 18.

The cone 12 completely covers the plant 19 to keep the fertilizer off of it and at the same time serves to guide the fertilizer into the desired position. In practice the operator may travel up and down the rows of plants quickly without having to stoop over and hold up the lower branches of the plants by hand to distribute the fertilizer as has heretofore been required.

Moreover, by the use of my invention, the fertilizer is deposited at the proper distance from the plant stalk to insure its being received by the finer roots of the plant system. After the operator becomes experienced, the distributor can be thrust over the plant and brought into close contact with the ground without actually resting upon it, the fertilizer dropped into the distributor and the distributor moved on to the next plant in almost a continuous movement without the necessity of having to set the distributor actually on the ground.

While I have here shown and described my invention in the best form as now known to me, it is obvious that structural changes may be made without departing from the spirit of the invention, and I therefore, do not desire to be limited to that precise form, nor any more than may be required by the following claims.

I claim:

1. In a fertilizer distributor, a tubular body, an outwardly flaring base continuous with the body, a conical wall within the base spaced therefrom to provide an annular passage therearound for fertilizer, a cup within the body having an opening through its bottom of less diameter than that of the body receiving the apex of the conical wall therethrough, a funnel at the mouth of the body, and a tube within the body discharging into said cup from the funnel.

2. In a fertilizer distributor for plants, a tubular body, a hollow base continuous with the body, and a hollow cone within the base, said cone being spaced from the base to permit fertilizer to slide downwardly thereover, and being open at its bottom to receive a plant therein, and a cup in the body having an opening through its bottom of less diameter than that of the body and receiving the apex of said cone therethrough.

3. In a fertilizer distributor for plants, a tubular body, a hollow base continuous with the body, and a hollow cone within the base, said cone being spaced from the base to permit fertilizer to slide downwardly thereover, and being open at its bottom to receive a plant therein, and a cup in the body having an opening through its bottom of less diameter than that of the body and receiving the apex of said cone therethrough, and a fertilizer pipe discharging into said cup.

In testimony whereof I affix my signature.

JOHN F. RAVENCROFT.